United States Patent [19]

Marques

[11] Patent Number: 5,560,087

[45] Date of Patent: Oct. 1, 1996

[54] LATERALLY SECURE HOSE-CLAMP ASSEMBLY

[75] Inventor: A. J. Marques, St. Augustine, Fla.

[73] Assignee: Stant Corporation, Deerfield, Ill.

[21] Appl. No.: 451,039

[22] Filed: May 25, 1995

Related U.S. Application Data

[62] Division of Ser. No. 95,678, Jul. 21, 1993.

[51] Int. Cl.$^6$ .................................................. B65D 63/00
[52] U.S. Cl. ............... 24/274 R; 24/19; 24/279
[58] Field of Search ............... 24/274 R, 274 P, 24/279, 282, 483, 19

[56] References Cited

U.S. PATENT DOCUMENTS

| 2,571,659 | 10/1951 | Bergstrom | 24/274 R |
| 3,398,440 | 8/1968 | Bergstrom | 24/274 |
| 4,099,304 | 7/1978 | Luc | 24/274 R |
| 4,237,588 | 12/1980 | Rasmussen et al. | 24/274 R |
| 4,257,149 | 3/1981 | Sydendal | 24/274 R |
| 4,473,928 | 10/1984 | Johnson | 24/274 R |
| 4,993,124 | 2/1991 | Ouimet | 24/274 R |

FOREIGN PATENT DOCUMENTS

| 119716 | 7/1947 | Sweden | 24/274 R |

OTHER PUBLICATIONS

A micro–clamp by Sawakyu, a Japanese Company, sold in Japan before the filing date of the present application.

Primary Examiner—Victor N. Sakran
Attorney, Agent, or Firm—Banner & Allegretti, Ltd.

[57] ABSTRACT

The laterally secure clamp assembly for use with clamps that cannot be force fit according to the present invention comprises a flexible band containing a cut-out proximate one end, and a series of elongated notches at the opposite end, a worm screw and a housing adapted to be secured to the band. The housing comprises a pair of planar tabs enclosing the band. Each tab comprises at least one abbreviated finger, extending from each tab and oriented at an angle in the direction of the screw. The fingers are oriented prior to assembly so that when the tabs are bent over to secure the band, the angled fingers abut the cut-out, preventing lateral force deformation of the housing.

15 Claims, 2 Drawing Sheets

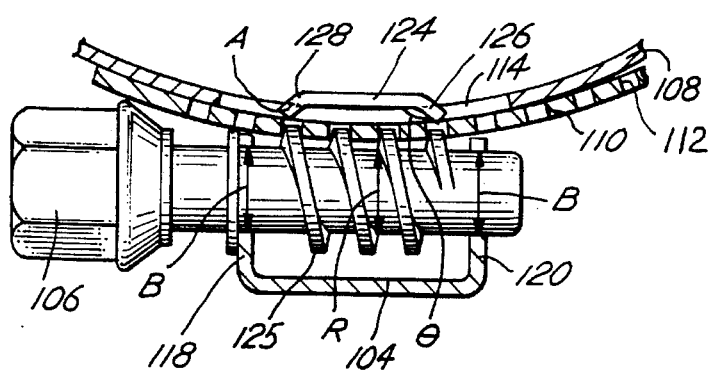
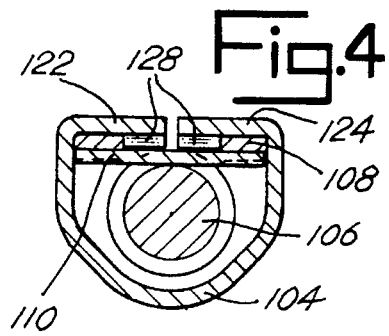

LATERALLY SECURE HOSE-CLAMP ASSEMBLY

This is a divisional of application Ser. No. 08/095,678, filed Jul. 21, 1993.

FIELD OF THE INVENTION

The present invention relates to hose clamps of the type often used for automotive applications. More specifically, this invention relates to hose-clamps utilizing a worm screw drive.

BACKGROUND OF THE INVENTION

Hose clamps of a multiplicity of configurations are well known in the art. Generally, the clamps are comprised of a notched band, a housing connected to the band, and a worm screw in the housing that cooperates with the notches of the band. An example of a prior art hose-clamp is shown in FIG. 1 where it can be seen that rotation of the worm screw causes the diameter of the band to decrease about the object to be clamped.

A primary property of a worm drive clamp is the magnitude of the torque required to produce failure of the clamp. The usual failure of this type of clamp construction, when tested to destruction, is caused by the rotating screw acting frictionally upon the band and producing a lateral or side acting force. The lateral acting force in turn acts on the side of the housing and causes the housing to deform and open the connection between housing and band. This results in failure by allowing the notched band to lose its engagement with the screw threads.

Several prior art references disclose means for more securely connecting the housing to the band, such as U.S. Pat. No. 4,993,124 to Ouimet, and U.S. Pat. No. 4,473,928 to Johnson. Additionally, U.S. Pat. No. 4,257,149 to Sydendal recognizes the problem of lateral force deformation, and discloses a structure designed to avoid the problem.

The clamps disclosed in the prior art designed to avoid lateral force deformation necessarily utilize a "force fit" assembly process. For example, the Ouimet '124 patent discloses a housing with wings that help secure the housing to the band. Assembly of such a device first requires placement of the band within the housing. The wings, extending into the housing, are then bent into shape to secure the band. The worm screw cannot be placed in the housing prior to bending of the wings as access to the wings would otherwise be prevented.

The next step of the assembly process is to force fit the worm screw into the housing by threading the worm screw into the housing. Because of the helix angle of the worm screw, the screw enters the housing at an angle and strikes the interior of the housing. However, the housing in a standard clamp is resilient enough to allow the screw to continue to be threaded into place through the force fitting. None of these references, nor any of the prior art, however, discloses a structure for avoiding lateral force deformation in clamps of the configuration requiring insertion of the worm screw in the housing prior to attachment of the band to the housing: i.e., clamps that cannot be force fit.

One example of a clamp that cannot be force fit is a micro-clamp. Force fitting of the worm screw into the housing is not possible because the reduced size of the housing results in housings with increased stiffness that do not permit complete threading of the screw into place.

Due to the inherent nature of micro-clamps, a different assembly sequence is therefore required. The worm screw is placed inside of the housing before the band, thus blocking access to any of the prior art structures for avoiding lateral force deformation.

A second common example of a clamp that cannot be force fit is an assembly (either standard or micro) utilizing a screw thread of a root diameter larger than the screw bearing diameters in the housing. In such a case, the screw bearing diameters in the housing do not permit entry and threading of the screw into the housing. The industry's solution to this problem is to again place the worm screw inside of the housing, prior to insertion of the band. Thus, until now, micro-clamps and clamps utilizing root diameters larger than bearing diameters have continued to suffer from lateral force deformation and its accompanying problems.

SUMMARY OF THE INVENTION

It is therefore an object of the present invention to provide a clamp assembly that prevents lateral force deformation of the housing.

A further object of this invention is to provide a clamp assembly that prevents lateral force deformation of the housing in clamps that cannot be force fit.

Another object of this invention is to provide a clamp assembly that strengthens the connection between the housing and the band in clamps that cannot be force fit.

To accomplish these objects, the clamp assembly of the present invention comprises a flexible band containing a cut-out proximate one end, and a series of elongated notches at the opposite end, a worm screw and a housing adapted to be secured to the band. The housing comprises a pair of planar tabs enclosing the band. Each tab comprises at least one abbreviated finger, extending from each tab and oriented at an angle in the direction of the screw. The fingers are oriented prior to assembly so that when the tabs are bent over to secure the band, the angled fingers abut the cut-out, preventing lateral force deformation of the housing.

Other objects and advantages of the invention will become apparent from the following description of the invention.

BRIEF DESCRIPTION OF THE DRAWINGS

In the detailed description that follows, reference will be made to the drawings in the following figures:

FIG. 3 is a partial sectional view of an embodiment of the invention, taken along the longitudinal axis of the band in FIG. 2;

FIG. 4 is a partial sectional view of an embodiment of the invention, taken along an axis perpendicular to the longitudinal axis of the band in FIG. 2.

DESCRIPTION OF THE PREFERRED EMBODIMENT

Figure 1:
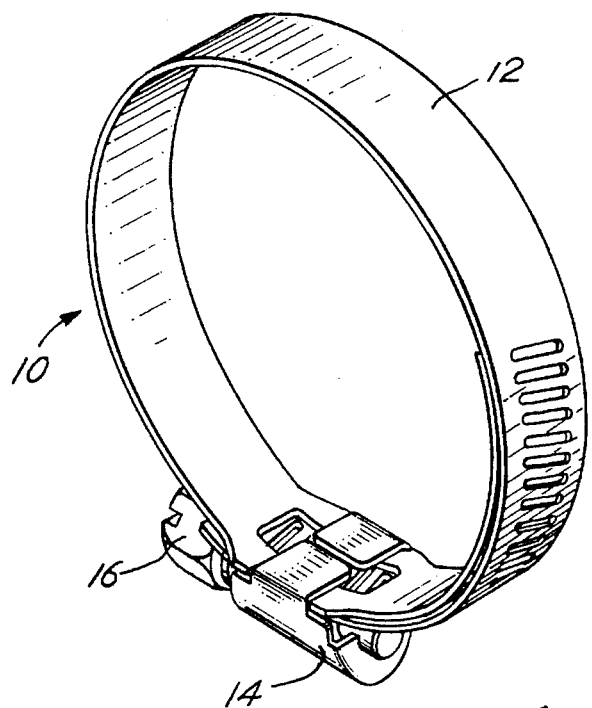
FIG. 1 is a perspective view of a typical clamp that is well known in the prior art.

Referring to FIG. 1, a clamp 10 that is well known in the prior art is shown. The clamp 10 is comprised of a flexible band 12, a housing 14, and a worm screw 16. As described above, clamps such as this one are subject to lateral force deformation of the housing 14 when the worm screw 16 is rotated about its longitudinal axis.

Figure 2:
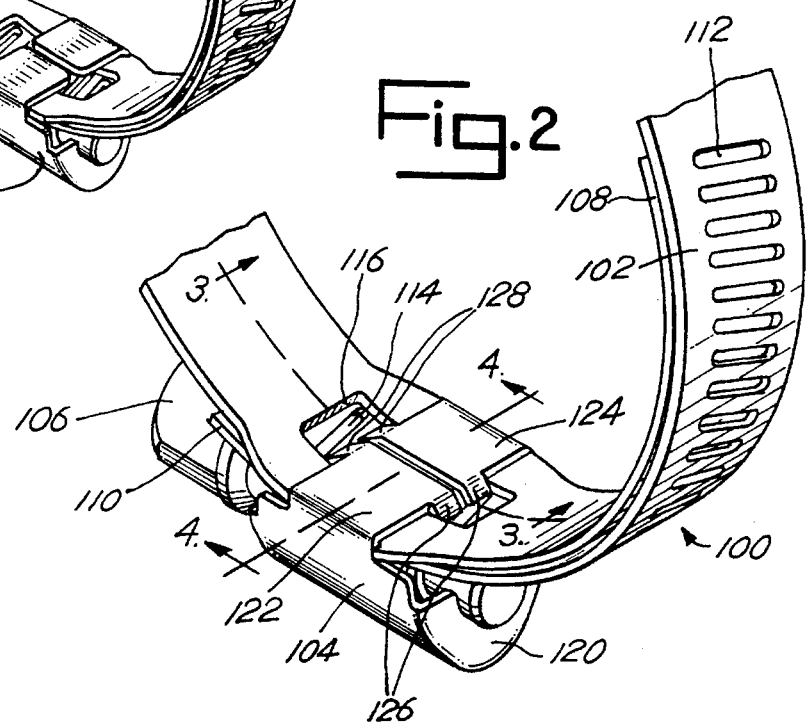
FIG. 2 is an enlarged partial perspective view of an embodiment of the present invention, showing the containment means on the housing.

Turning now to FIGS. 2 through 4, a micro-clamp 100 according to the present invention is shown. The micro-clamp is comprised of a flexible band 102, a housing 104, and a worm screw 106. The flexible band 102, is formed of a thin, elongated strip of material. For most applications the material is metal, however this invention is not limited by the character of the strip material, which could instead be a polymer, or composite. The nature of the strip material is generally defined by its particular application, and the properties required.

The flexible band 102 is further defined by a front end 108, and a notched end 110. Proximate the notched end 110, a plurality of parallel elongated engaging notches 112 pass through the flexible band 102. The engaging notches 112 are generally oriented at a small angle off the perpendicular to the longitudinal axis of the band 102. A common angle for the engaging notches is six degrees off the perpendicular, but of course this angle can vary. The angle is determined by the helix angle of the worm screw 106, with which the engaging notches must cooperate as is well known in the art.

The length of the flexible band 102 and the number of engaging notches 112 varies with the particular application. Alternatively, engaging grooves that pass only partially through the band, or elevated engaging teeth may be used in place of the, engaging notches. The width of the flexible band 102 may also vary, however as band widths decrease, housing sizes also decrease. At about 7/16 of an inch, the width of the band and size of the housing prevent force fitting described above.

Proximate the front end 108 an elongated cut-out 114 is provided. The cut-out 114 defines a shoulder 116 around the periphery of the cut-out 114.

Housing 104 is a generally hollow enclosure with a front end wall 118 and rear end wall 120 defining opposite ends of the housing 104. Front end wall 118 and rear end wall 120 serve as bearing surfaces for worm screw 106, defining bearing diameters B that allow worm screw 106 to freely rotate about its longitudinal axis. Worm screw 106 has a spiral thread 125 that defines the screw's helix angle.

Formed integrally with the housing are planar tabs 122 and 124, adapted to firmly engage flexible band 102. Containment means are provided on the tabs 122 and 124 to resist lateral load deformation of the tabs 122 and 124. More specifically, the containment means comprise at least one integrally formed abbreviated finger extending from each tab 122 and 124. As shown in FIGS. 2 through 4, the containment means comprises a pair of abbreviated fingers 126 and 128 extending from opposing ends of each tab 122 and 124. The fingers 126 and 128 are oriented at an angle θ to the plane defined by each tab 122 and 124, such that when the housing 104 is in the closed position as shown in the figures, fingers 126 and 128 extend in the direction toward the worm screw 106.

As is clear from FIGS. 2 and 3, the length of fingers 126 and 128 and angle of orientation θ of the fingers define a finger surface area A that contacts shoulder 116 of cut-out 114. The finger surface area A of each of the plurality of fingers when taken in combination must provide sufficient surface area contact with shoulder 116 to resist the requisite lateral load deformation of tabs 122 and 124 when in use. However, the length of fingers 126 and 128 and the angle of orientation θ of the fingers must be such that the fingers do not interfere with the notched end 110 of band 102, or with the thread 125 of worm screw 106.

In practice, the micro-clamp 100 of the present invention is assembled as follows. Housing 104 is initially in the open position, with tabs 122 and 124 at substantially right angles to their position as shown in the figures. Abbreviated fingers 126 and 128 are oriented to their angled position discussed above by bending of the fingers, or by pre-manufacture of the fingers in the angled orientation.

Next, worm screw 106 is aligned in the housing 104 to provide for rotation of the screw 106 about its longitudinal axis. The notched end 110 of band 102 and front end 108 of band 102 are simultaneously placed into housing 104, between tabs 122 and 124, and in engagement with the screw 106. The housing 104 is then connected to the band 102 by bending of the tabs 122 and 124 to the substantially horizontal position shown in FIG. 2. Bending of tabs 122 and 124 results in fingers 126 and 128 abutting shoulder 116 of band 102 along the bearing surface area A of each finger.

A second embodiment of the invention is for use with a clamp assembly in which the root diameter of the screw 106, in FIG. 3, is greater than the bearing diameters B of housing 104. Assembly and use of the clamp is virtually identical to the discussion for micro-clamps above. The only significant difference is the design of the screw 106. The diameter of the screw proximate the bearing surfaces 120 and 118 is reduced from the root diameter to accommodate the reduced bearing diameters B of the housing.

It is now clear that the present invention provides a laterally secure clamp assembly adaptable to clamps that cannot be force fit by furnishing containment means for resisting lateral load deformation of the housing, thus preventing failure of the clamp from this cause.

Although an exemplary embodiments of the invention have been shown and described, many changes and substitutions may be made by persons of ordinary skilled in the art without departing from the scope of the invention. This invention therefore includes alternatives to the specific configurations described in the exemplary embodiments and is limited only by the language of the claims.

What I claim is:

1. A hose-clamp assembly comprising, a thin elongated flexible band having a front end and notched end, the band further comprising an elongated cut-out proximate the notched end of the band defining a shoulder in the cut-out, a generally hollow housing having a pair of integrally formed planar tabs adapted to firmly engage the flexible band, a worm screw of the type that cannot be force fit into the housing rotatably supported by bearing surfaces integrally formed in the housing, and containment means integrally formed on the tabs, the containment means being in bearing contact with the shoulder in the cut-out along a portion of the shoulder that is generally parallel to the axis of the worm screw, whereby lateral load deformation of the housing is prevented by the interaction of the containment means and shoulder in the cut-out.

2. A hose-clamp according to claim 1 wherein the containment means is oriented at an angle such that the containment means extends from each tab in the direction of the screw, and the length of the containment means and the angle of orientation of the containment means are such that the containment means does not interfere with the band, or with the worm screw during use.

3. The hose-clamp assembly of claim 1 wherein the containment means comprises at least one integrally formed abbreviated finger extending from each tab.

4. The hose clamp assembly of claim 1 wherein the containment means is in bearing contact with the shoulder of the cut-out only along a portion of the cut-out that is generally parallel to the axis of the worm screw.

5. The hose-clamp assembly of claim 3 wherein at least one integrally formed finger extends from a tab at an angle in the direction of the screw, and the length of the finger and the angle of orientation of the finger are such that the finger does not interfere with the band or the worm screw during use.

6. The hose-clamp assembly of claim 5 wherein the integrally formed finger extending from the tab is set in its angle of orientation relative to the tab before the housing is connected to the band.

7. The hose clamp assembly of claim 6 wherein the hose-clamp is a micro-clamp.

8. The hose clamp assembly of claim 6 wherein the width of the flexible band is no greater than 7/16 of an inch.

9. The hose clamp assembly of claim 6 wherein the root diameter of the worm screw is greater than the bearing diameter of the housing.

10. A hose-clamp assembly comprising, a thin elongated flexible band having a front end and notched end, the band further comprising an elongated cut-out proximate the notched end of the band defining a shoulder in the cut-out, a generally hollow housing having a pair of integrally formed planar tabs adapted to firmly engage the flexible band, a worm screw of the type that cannot be force fit into the housing rotatably supported by bearing surfaces integrally formed in the housing, and an integrally formed abbreviated finger on at least one of the tabs, the abbreviated finger being in bearing contact with the shoulder in the cut-out only along a portion of the shoulder that is generally parallel to the axis of the worm screw, whereby lateral load deformation of the housing is prevented by the interaction of the abbreviated finger and shoulder in the cut-out.

11. The hose-clamp assembly of claim 10 wherein at least one integrally formed finger extends from a tab at an angle in the direction of the screw, and the length of the finger and the angle of orientation of the finger are such that the finger does not interfere with the band or the worm screw during use.

12. The hose-clamp assembly of claim 11 wherein the integrally formed finger extending from the tab is set in its angle of orientation relative to the tab before the housing is connected to the band.

13. The hose clamp assembly of claim 12 wherein the hose-clamp is a micro-clamp.

14. The hose clamp assembly of claim 12 wherein the width of the flexible band is no greater than 7/16 of an inch.

15. The hose clamp assembly of claim 12 wherein the root diameter of the worm screw is greater than the bearing diameter of the housing.

\* \* \* \* \*